United States Patent [19]
Neuerburg et al.

[11] Patent Number: 6,128,892
[45] Date of Patent: Oct. 10, 2000

[54] LIMITER DEVICE INTENDED TO EQUIP AN AGRICULTURAL MACHINE-CUTTING MACHINE EQUIPPED WITH SUCH A DEVICE

[76] Inventors: Horst Neuerburg, 6, Rue des Aubépines; Fernand Kieffer, 32, Rue de la Mesange, both of F-67700 Saverne, France

[21] Appl. No.: 09/175,346

[22] Filed: Oct. 20, 1998

[30] Foreign Application Priority Data

Oct. 21, 1997 [FR] France ................................. 97 13413

[51] Int. Cl.[7] .......................... A01D 34/66; A01D 34/82
[52] U.S. Cl. ................... 56/6; 56/15.2; 56/15.8
[58] Field of Search .................. 56/6, 10.2 R, DIG. 15, 56/16.4 R, 279, 280, 287, 229, DIG. 16, 15.1, 15.2, 15.6, 15.7, 15.8, 15.9

[56] References Cited

U.S. PATENT DOCUMENTS

| | | |
|---|---|---|
| 704,604 | 7/1902 | Warner .......................................... 56/6 |
| 4,286,423 | 9/1981 | Caldwell et al. ............................ 56/6 |
| 5,566,537 | 10/1996 | Neuerburg et al. . |
| 5,727,371 | 3/1998 | Neuerburg et al. . |
| 5,806,291 | 9/1998 | Lehman et al. ............................... 56/6 |
| 5,943,848 | 8/1999 | Rice et al. .................................... 56/6 |

FOREIGN PATENT DOCUMENTS

| | | |
|---|---|---|
| 0 068 560 | 1/1983 | European Pat. Off. . |
| 0 402 957 | 12/1990 | European Pat. Off. . |
| 0 709 018 | 5/1996 | European Pat. Off. . |

*Primary Examiner*—Thomas B. Will
*Assistant Examiner*—Nathan Mammen
*Attorney, Agent, or Firm*—Oblon, Spivak, McClelland, Maier & Neustadt, P.C.

[57] ABSTRACT

A machine for cutting plant matter equipped with a limiter device includes a first assembly connected to a first unit and a second assembly connected to a second unit. The second unit is connected to the first unit by an articulation allowing the second unit to pivot about an axis of the articulation within limits allowed by at least one stop. The stop is elastically deformable so as to limit pivoting of the second unit about the axis when the second unit is subjected to a first pivoting torque, and so as to tolerate a much greater amount of pivoting of the second unit about the axis when the second unit is subjected to a second pivoting torque.

23 Claims, 8 Drawing Sheets

LIMITER DEVICE INTENDED TO EQUIP AN AGRICULTURAL MACHINE-CUTTING MACHINE EQUIPPED WITH SUCH A DEVICE

BACKGROUND OF THE INVENTION

1. Field of the Invention

The present invention relates to a limiter device intended to equip an agricultural machine comprising a first assembly intended to be connected to a first unit and a second assembly intended to be connected to a second unit, said second unit being connected to said first unit by means of an articulation allowing said second unit to pivot about the axis of said articulation within the limits allowed by at least one stop forming part of said limiter device.

2. Discussion of the Background

Document FR-A-2 726 152 discloses an agricultural machine intended for cutting plant matter equipped with such a limiter device. This agricultural machine, broadly speaking, comprises:

- a hitching structure intended to be connected to a motor vehicle;
- a cutting mechanism, intended to be driven in motion by the motor vehicle by means of drive members and which may extend:
   - in the working position, transversely to the direction of forward travel and resting on the ground;
   - in the windrowing position, transversely to the direction of forward travel and above the surface of the ground; and
   - in a transport position.
- a suspension arm connected, on the one hand, to the hitching structure and, on the other hand, to the middle of the cutting mechanism by means of an articulation of longitudinal axis oriented in the direction of forward travel during work when said cutting mechanism is in the working position, so as to allow this mechanism to pivot about said longitudinal axis; and
- a limiter device intended, on the one hand, to limit the pivoting of said cutting mechanism when the latter is in the working position or windrowing position and, on the other hand, to prevent said pivoting when said cutting mechanism is in the transport position. This known limiter device comprises a first assembly connected to the suspension arm and a second assembly connected to the cutting mechanism. The first assembly comprises a catch which can pivot about an axis of pivoting and is intended to interact with two stops belonging to a limiter which forms part of the second assembly. The limiter for this purpose comprises an elongate opening inside which the axis about which the catch can pivot extends, the ends of said opening each forming a stop.

In the working position and in the windrowing position, the catch is retracted so as to allow the limiter, more specifically the elongate opening, to move with respect to the axis about which said catch can pivot, and to do so within the limits allowed by the ends of said opening, thus allowing the cutting mechanism to pivot about the articulation which connects it to the suspension arm.

In the transport position, the catch is pivoted about its axis of pivoting so that it extends substantially parallel to the elongate opening of the limiter so as to come into contact, on the one hand, with one of the ends of said opening and, on the other end, with the other end of said opening. Such a construction practically prevents any movement by the elongate opening with respect to said axis of pivoting and therefore prevent the cutting mechanism from pivoting about the articulation that connects it to the suspension arm.

The cutting mechanism comprises cutting members located in a line that is transverse to the direction of forward travel, which members are intended to be driven in rotation by the drive members.

For this, the drive members comprise a telescopic transmission shaft with universal joints, which extends transversely to the direction of forward travel when the cutting mechanism is in the working position. This transmission shaft is intended to transmit the movement to a transmission gearbox situated above the cutting member closest to the hitching structure.

One of the advantages of this known limiter device is that it allows, especially in the working position, a large and free pivoting of the cutting mechanism about the articulation that connects it to the suspension arm. Such a pivoting of the cutting mechanism allows the latter to closely follow the lie of the land during work.

It is, however, commonplace during work, for cut plant matter or earth to stick to the cutting mechanism, and this has the effect of weighing down and unbalancing said cutting mechanism when the latter is extended in the windrowing position. Because of this, the cutting mechanism pivots to one side or the other about the longitudinal axis of the articulation connecting it to the suspension arm, and the result of this is to reduce the ground clearance of said known agricultural machine. There is a risk that such an agricultural machine will, in the windrowing position, extend too close to the ground and thereby hamper maneuvers at the end of the field which will require the operator to be more attentive during maneuvers at the end of the field and all too often result in a collision between the cutting mechanism and the ground. There is the risk that such collisions between the cutting mechanism and the ground may damage the agricultural machine.

SUMMARY OF THE INVENTION

The object of the present invention is to improve the known limiter device which equips this agricultural machine for cutting plant matter.

To this end, the limiter device according to the present invention is one wherein said stop (at least one stop) is elastically deformable so as to limit, on the one hand, the pivoting of the second unit about the axis when said second unit is subjected to a first pivoting torque, and so as to tolerate, on the other hand, a much greater amount of pivoting of said second unit about said axis when said second unit is subjected to a second pivoting torque.

The present invention also relates to a machine for cutting plant matter, comprising:

- a hitching structure intended to be connected to a motor vehicle;
- a cutting mechanism extending:
   - in the working position, transversely to the direction of forward travel and resting on the ground;
   - in the windrowing position, transversely to the direction of forward travel and above the surface of the ground;
- a suspension arm connected, on the one hand, to the hitching structure and, on the other hand, to the cutting mechanism by means of an articulation whose axis is oriented at least substantially in the direction of forward travel during work when said cutting mechanism is in the working position, so as to allow said cutting mechanism to pivot about said axis;

a limiter device comprising at least one stop allowing said cutting mechanism to pivot about said axis within the limits allowed by the stop(s), the suspension arm forming the first unit, and the cutting mechanism forming the second unit.

Such a limiter device equipping such a machine for cutting plant matter allows, in the working position, a certain amount of free pivoting and a large displacement of the cutting mechanism about the longitudinal axis of the articulation connecting it to the suspension arm, while giving a large ground clearance in the windrowing position.

The invention also relates to the following features taken in isolation or in any technically possible combination:

the second pivoting torque is greater than the first pivoting torque;

the stop(s) comprises (comprise) at least one elastic element connected to one of the assemblies and intended to come into contact with the other assembly when the second unit pivots about the axis by a certain amount, this (these) elastic element(s) in particular allows (allow) the second unit to widely pivot about the axis of the articulation connecting this unit to the first unit;

the second unit can pivot about the axis in two distinct phases:
  a first phase, to which the limited pivoting of said second unit corresponds and in which said second unit pivots freely about said axis between the limits allowed by the stop(s);
  a second phase to which the much greater pivoting of said second unit corresponds and in which said second unit pivots about said axis between the limits allowed by the stop(s) against the forces developed by the elastic element(s);

the elastic element(s) is (are) intended to return the second unit from the second phase to the first phase, which in particular makes it possible to ensure that the second unit is in a certain position when it is no longer subjected to a pivoting torque or a relatively low pivoting torque;

the position and/or stiffness of the stop(s) is (are) adjustable so as to allow the position of the second unit when no longer subjected to a pivoting torque or to a very small pivoting torque to be adjusted, on the one hand, and so as to allow the intensity of the pivoting torque that will allow said second unit to be pivoted further about the axis of the articulation to be adjusted, on the other hand;

the stop(s) is (are) intended to dissipate all or some of the forces generated by the pivoting of the second unit about the axis of the articulation;

the limiter device is combined with a locking device intended to at least substantially prevent the pivoting of the second unit about the axis of the articulation;

the locking device comprises a catch connected to one of the assemblies and intended to act on the other assembly in order to prevent the second unit from pivoting about the axis of the articulation;

an operating device intended to operate the locking device is provided;

the cutting mechanism may be pivoted into a transport position, when brought into the transport position, the operating device automatically operates the locking device, which automatically prevents the cutting mechanism from pivoting when brought into said transport position.

BRIEF DESCRIPTION OF THE DRAWINGS

Other objects and features will emerge from the description hereafter with reference to the appended drawings which depict, by way of nonlimiting examples, a number of embodiments of the cutting machine equipped with the limiter device of the invention.

In these drawings.

DESCRIPTION OF THE PREFERRED EMBODIMENTS

The cutting machine 1 as depicted in FIGS. 1 to 7 is similar to the one described in document FR-A2726 152. For further details, reference may, if need be, be made to the text of said document.

The cutting machine 1 as depicted in FIGS. 1 to 7 comprises a hitching structure 2 equipped with two lower hitching points 3, 4 and an upper hitching point 5, by means of which points said cutting machine 1 is connected to the hitching device 6 of a motor vehicle 7. In the embodiment depicted, the hitching device 6 of the motor vehicle 7 comprises two lower hitching arms 8, 9 and a top link 10 allowing the hitching structure 2 of the cutting machine 1 to be moved at least substantially vertically.

Connected to the hitching structure 2 by means of a first articulation 13 of at least substantially vertical longitudinal axis 13a is a suspension arm 12. A cutting mechanism 14 is connected to the end of the suspension arm 12 by means of a second articulation 15, the longitudinal axis 15a of which is at least substantially horizontal and oriented at least substantially in the direction of forward travel during work 16 when said cutting mechanism 14 is in the working position as depicted in FIGS. 1 and 2.

The cutting mechanism 14 and the suspension arm 12 extend, in the working position and in the windrowing position, so that they are transverse to the direction of forward travel 16 whereas, in the transport position, said cutting mechanism 14 and said suspension arm 12 extend at least substantially in the direction of forward travel 16. In the working position, the cutting mechanism 14 rests on the ground S, while in the windrowing position, said cutting mechanism 14 extends above the surface of the ground S.

For this purpose, a maneuvering means 18 comprising a hydraulic ram 19 intended to pivot the suspension arm 12 and the cutting mechanism 14 from the transport position into the windrowing position or vice versa about the longitudinal axis 13a of the first articulation 13 is provided.

Figure 1:
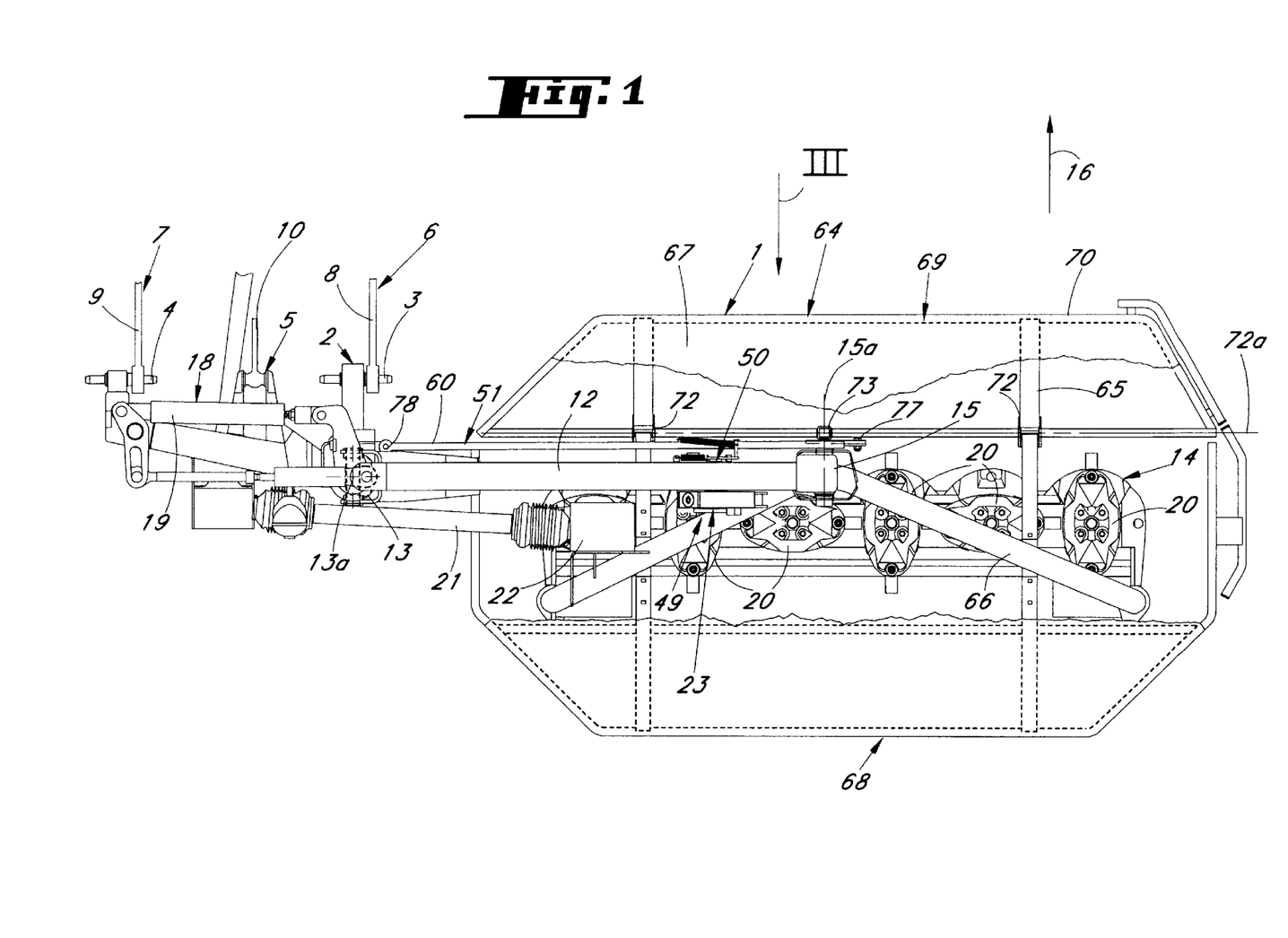
FIG. 1 depicts a cutting machine equipped with the limiter device according to the invention in the working position and viewed from above, in a first embodiment.
Figure 2:
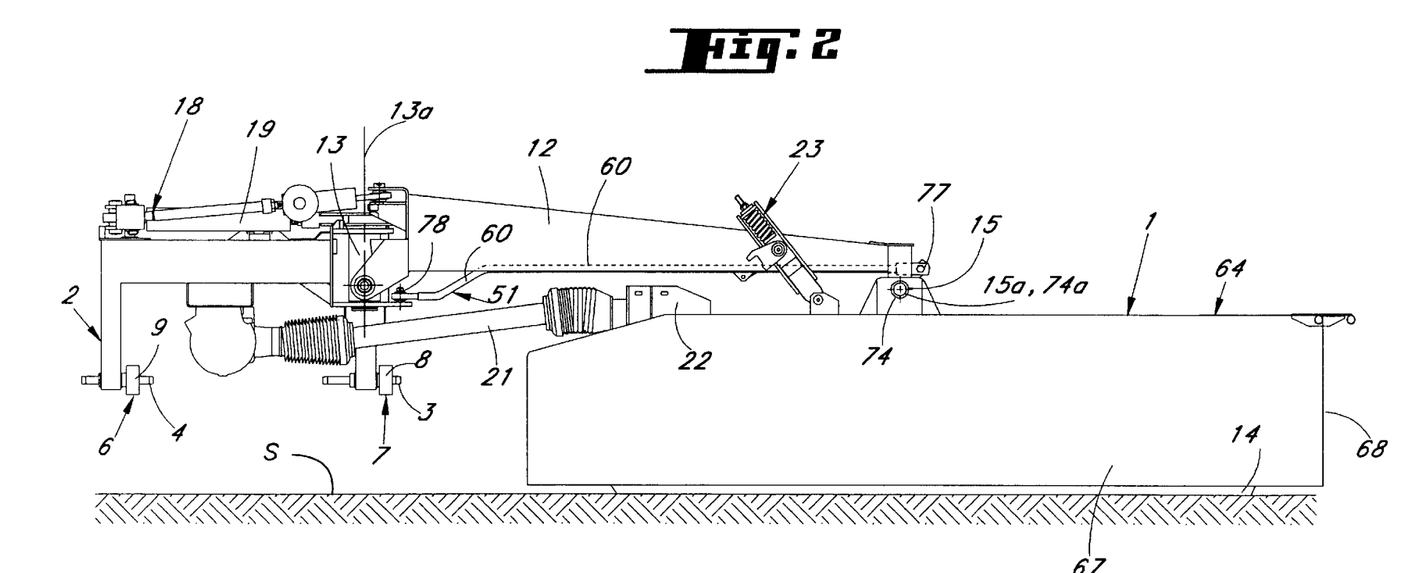
FIG. 2 depicts a rear view of the cutting machine of FIG. 1.

In the light of FIG. 1, it can also be seen that the cutting mechanism 14 comprises cutting members 20 intended to cut or chop standing plant matter. For this, drive members are provided, which comprise, in particular, a telescopic transmission shaft 21 with universal joints which is intended to transmit the movement to a transmission gearbox 22 situated above the cutting member 20 extending closest to the hitching structure 2.

In the light of FIGS. 1 to 7, it can also be seen that the cutting machine 1 is fitted with a limiter device 23 which, in the working position and in the windrowing position, allows the cutting mechanism 14 a certain amount of free pivoting and a large displacement about the longitudinal axis 15a of the second articulation 15 (within the limits allowed by said limiter device 23), while at the same time giving a large ground clearance and, in the transport position, allows said pivoting to be at least substantially prevented.

Figure 3:
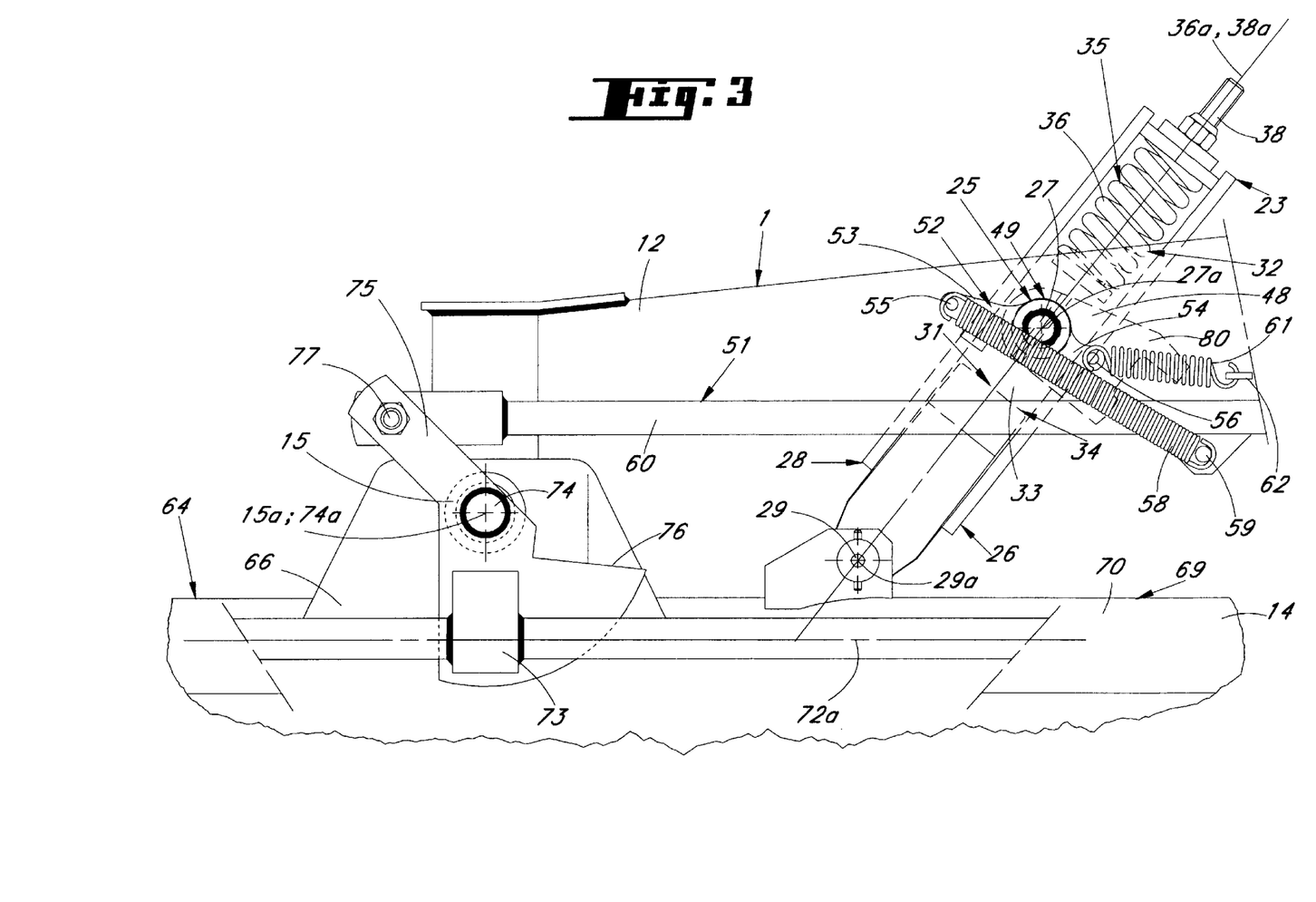
FIG. 3 depicts, on an enlarged scale, a part view of the cutting machine in the direction of the arrow III depicted in FIG. 1, in which a number of part sections have been taken.

For this, it can be seen more specifically in FIG. 3 that the limiter device 23 comprises a first assembly 25 and a second assembly 26. Said first assembly 25 is connected to a first unit which, in the embodiment depicted, is the suspension arm 12, while the second assembly 26 is connected to a second unit which, in the embodiment depicted, is the cutting mechanism 14.

The first assembly 25 comprises a journal 27 of longitudinal axis 27a substantially parallel to the longitudinal axis 15a of the second articulation 15, while the second assembly 26 comprises a limiter 28 which is connected to the cutting mechanism 14 by means of a third articulation 29 whose longitudinal axis 29a is at least substantially parallel to the longitudinal axis 15a.

The limiter device 23 comprises two stops 31, 32 with which the journal 27 is intended to come into contact so as to limit the pivoting of the cutting mechanism 14 about the longitudinal axis 15a of the second articulation 15. For this, the limiter 28 comprises an elongate opening 33 through which the journal 27 passes, one 31 of the stops 31, 32 being formed by the end 34 of said elongate opening 33 closest to the third articulation 29, while the other stop 32 is situated in the vicinity of the end 35 furthest from said third articulation 29.

It will be observed that the cutting mechanism 14 can pivot about the longitudinal axis 15a of the second articulation 15 in two distinct phases:

a first phase to which the limited pivoting of said cutting mechanism 14 corresponds and in which said cutting mechanism 14 pivots freely about said longitudinal axis 15a between the limits allowed by the stops 31, 32; and a second phase to which the much greater pivoting of said cutting mechanism 14 corresponds and in which said cutting mechanism 14 pivots about said longitudinal axis 15a between said authorized limits and against the forces developed by at least one of the stops 31, 32.

For this purpose, the other stop 32 is elastically deformable so as to limit, on the one hand, the pivoting of the cutting mechanism 14 about the longitudinal axis 15a of the second articulation 15 when said cutting mechanism 14 is subjected to a first pivoting torque, and so as to tolerate, on the other hand, a much greater pivoting of said cutting mechanism 14 about said longitudinal axis 15a when said cutting mechanism 14 is subjected to a second pivoting torque which is greater than the first pivoting torque.

Figure 4:
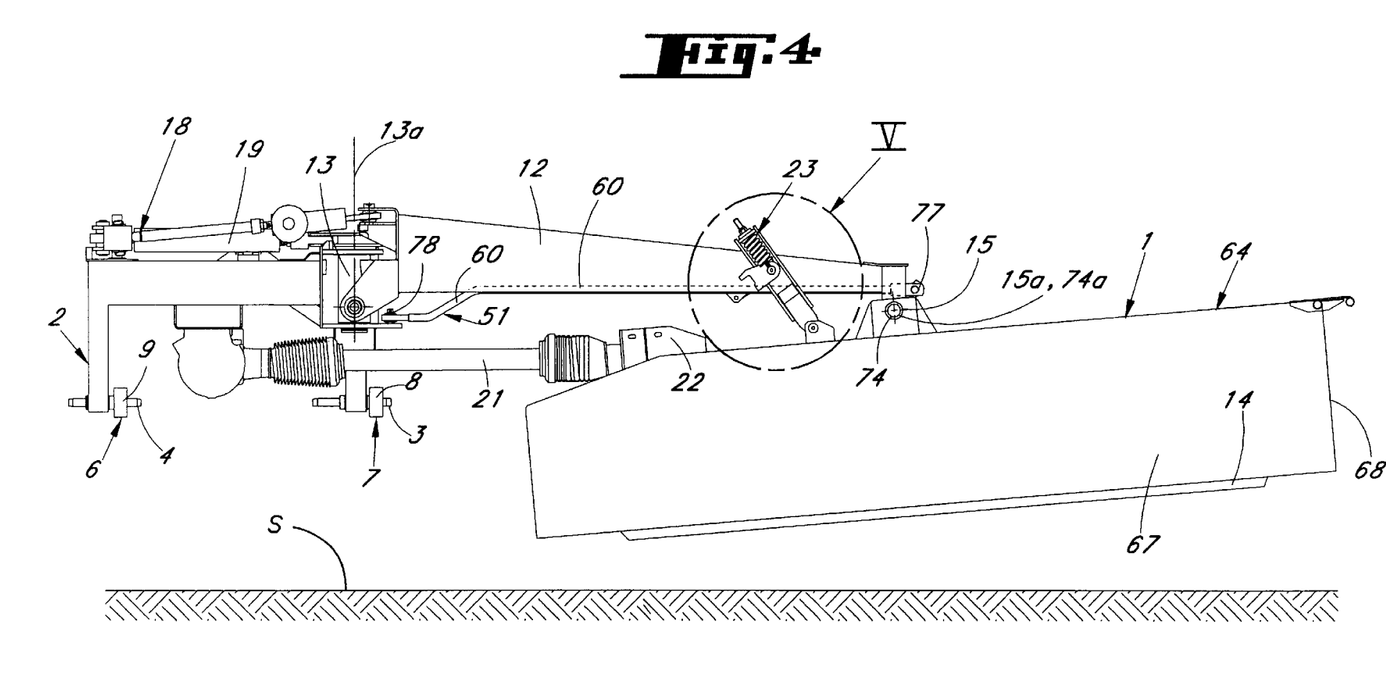
FIG. 4 depicts a rear view of the cutting machine of FIG. 1 in the windrowing position.
Figure 5:
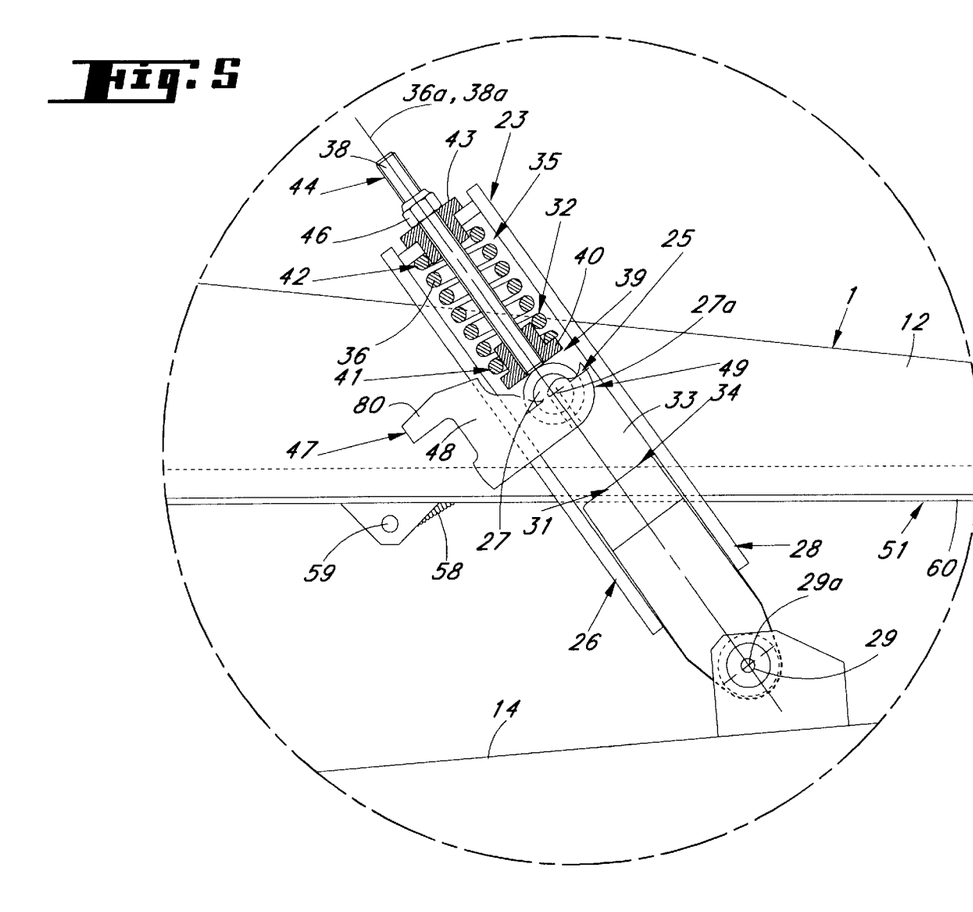
FIG. 5 depicts, on an enlarged scale, the region V of FIG. 4 and in which a number of part sections have been taken.

To achieve this, the other stop 32 comprises an elastic element which, in the embodiment depicted, is a compression spring 36 connected, on the one hand, to the limiter 28 at the end 35 furthest from the third articulation 29 of the elongate opening 33 and intended, on the other hand, to come into contact with the journal 27 when the cutting mechanism 14 pivots about the longitudinal axis 15a by a certain amount in the corresponding direction as depicted in FIGS. 4 and 5. It will, of course, be noted that the compression spring 36 can also come into contact with the journal 27 when the cutting mechanism 14 is extending in the working or transport position.

Figure 7:
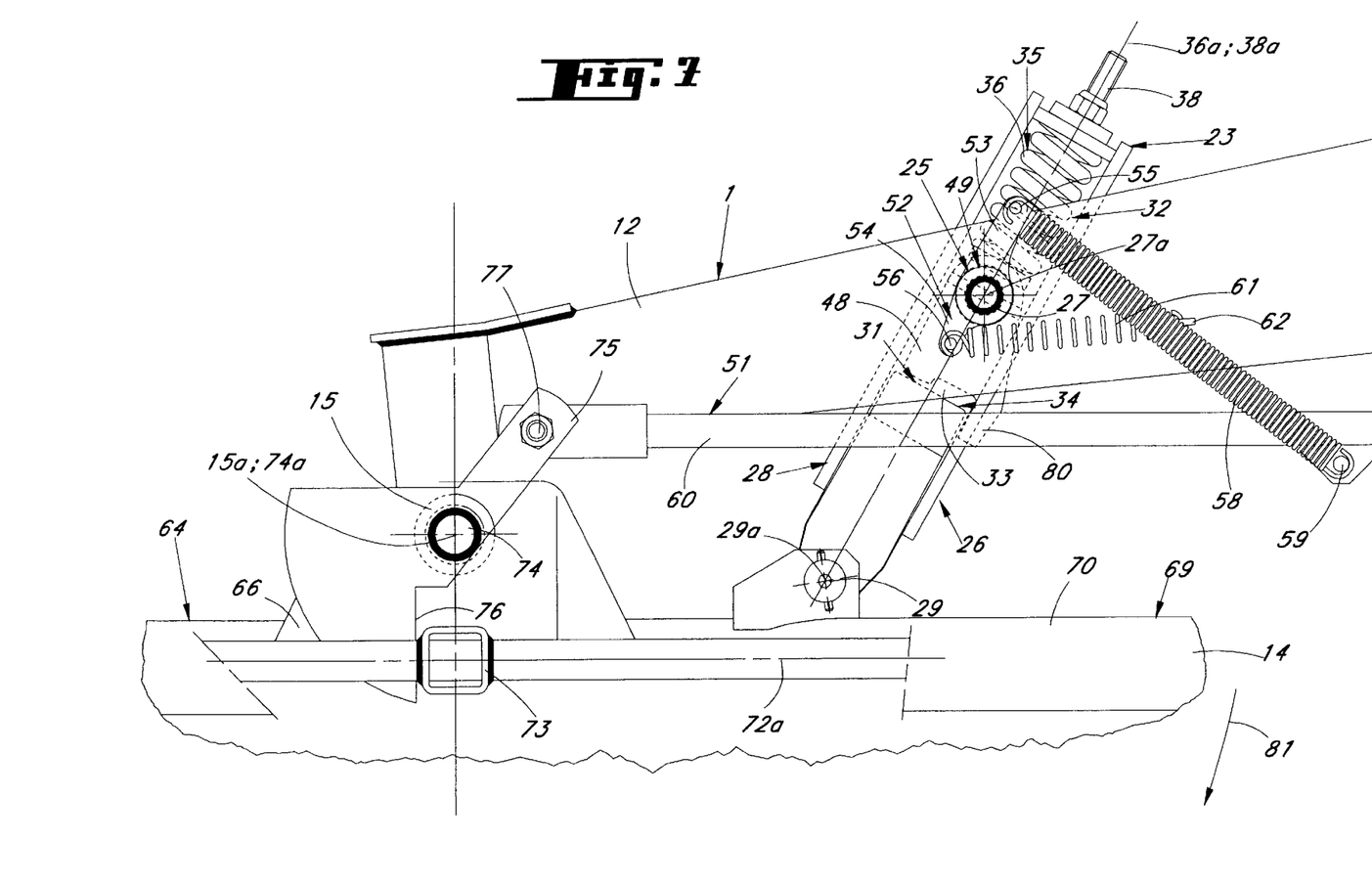
FIG. 7 depicts, on an enlarged scale, a part view of the cutting machine in the direction of arrow VII depicted in FIG. 6.

In the light of FIGS. 3, 5 and 7, it can be seen more clearly that the characteristics of the compression spring 36 can be modified. Indeed, FIG. 5 shows that extending inside the compression spring 36, in the embodiment depicted, is a threaded rod 38 whose longitudinal axis 38a substantially coincides with the longitudinal axis 36a of said compression spring 36. Screwed onto the end 39 of threaded rod 38 that is closest to the third articulation 29 is a first stop element 40 against which one 41 of the ends 41, 42 of the compression spring 36 rests.

Provided in the vicinity of the end 35 of the elongate opening 33 is a second stop element 43 resting, on the one hand, on the limiter 28 and, on the other hand, allowing the compression spring 36 to be centered at its other end 42 with respect to the threaded rod 38.

It will be noted that at its other end 42, the compression spring 36 rests on the limiter 28. The threaded rod 38 extends, at its other end 44, through the second stop element 43 and can slide therein. A nut 46 resting against the second stop element 43 is screwed on near to this other end 44.

By screwing down the nut 46 the threaded rod 38 is pulled, and this has the effect of bringing the first and second stop elements 40, 43 closer together and therefore allows the compression spring 36 to be compressed. By compressing the compression spring 36, the travel of the journal 27 inside the limiter 28 is increased and said compression spring 36 is stiffened, this making it possible, on the one hand, to enlarge the angle of free pivoting of the cutting mechanism 14 about the longitudinal axis 15a of the second articulation 15 and, on the other hand, to increase the intensity of the second pivoting torque described earlier.

Conversely, by unscrewing the nut 46, the threaded rod 38 is relaxed, and this has the effect of moving the stop elements 40, 43 apart and therefore relaxing the compression spring 36. By relaxing the compression spring 36 the travel of the journal 27 inside the limiter 28 is reduced and the stiffness of said compression spring 36 is reduced, this making it possible, on the one hand, to reduce the angle of free pivoting of the cutting mechanism 14 about the longitudinal axis 15a of the second articulation 15 and, on the other hand, to reduce the intensity of the second pivoting torque described earlier.

In the light of the various figures it can also be seen that the limiter device 23 is combined with a locking device 47 intended to at least substantially prevent the cutting mechanism 14 from pivoting about the longitudinal axis 15a of the second articulation 15. For this, the locking device 47 is equipped with a catch 48 fixed to one 49 of the ends 49, 50 of the journal 27.

This catch 48 is intended to act on the limiter 28 in the transport position to automatically prevent the cutting mechanism 14 from pivoting about the longitudinal axis 15a.

For this, an operating device 51 intended to operate the locking device 47 automatically during the movement into the transport position is provided.

For this to be achieved, the journal 27 extends, in the embodiment depicted, right through the suspension arm 12 and is connected to the latter in a pivoting manner.

Provided at the other end 50 of the journal 27 is a double lever 52 comprising a first arm and a second arm 53, 54, each equipped with a respective stud 55; 56.

To the stud 55 of the first arm 53 is connected a first tension spring 58 which is connected at its other end to a stud 59 belonging to a rigid rod 60. The stud 56 of the second arm 54 is, for its part, connected to a second tension spring 61 which is connected at its other end to a stud 62 belonging to the suspension arm 12.

In the light of FIG. 1, it can also be seen that the cutting mechanism 14 also comprises a guard 64 which goes around the cutting members 20. This guard 64 is intended to prevent physical injury by preventing unintentional access to the cutting members 20 and, depending on the nature of the cutting members 20, by preventing objects such as stones for example from being thrown out.

This guard 64 consists of a framework 65 connected to a member 66 that carries the cutting mechanism 14 and of a fabric 67 stretched over said framework 65 and fixed thereto. It has a rear part 68 which is stationary and a front part 69 which can move. The moving front part 69 is made in the form of a flap 70 which is connected indirectly to the carrier member 66 by means of an articulation 72 whose axis of pivoting 72a extends at least substantially horizontally and at least substantially at right angles to the direction of forward travel 16 when the cutting mechanism 14 is in the working position. The front part 69 of the guard 64 can thus be pivoted upward about the axis of pivoting 72a, in particular to allow easy access to the cutting members 20 of the cutting mechanism 14 so that their condition can be checked and so that they can, if need be, be replaced. Near the second articulation 15 connecting the cutting mechanism 14 to the suspension arm 12, the flap 70 also has a bearing member 73.

The second articulation 15 comprises a journal 74, the longitudinal axis 74a of which is coincident with the longitudinal axis 15a of the second articulation 15.

On the same side as the flap 70 of the guard 64, the journal 74 is equipped with a stop 75.

Figure 6:
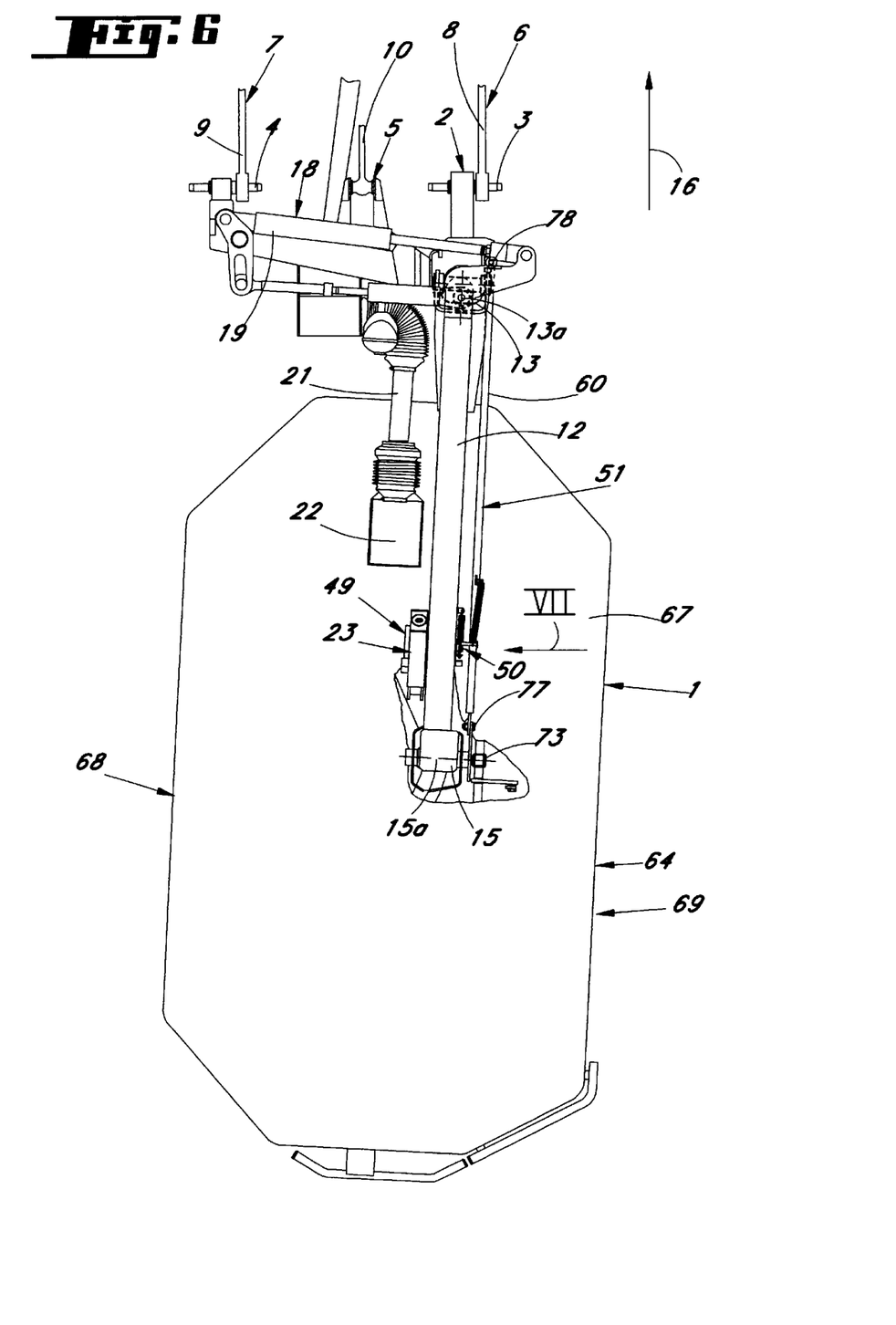
FIG. 6 depicts a top view of the cutting machine of FIG. 1 in the transport position.

This stop extends up close to the bearing member 73 of said flap 70 and it can be seen very specifically in FIGS. 3 and 7 that the shape and position of said stop 75 are such that the flap 70 cannot be pivoted upward about the axis of pivoting 72a when the cutting mechanism 14 is in the working position. The upward pivoting of the flap 70 is possible only when the cutting mechanism 14 is in the transport position (FIGS. 6 and 7). For this, the stop 75 has been pivoted appropriately about the axis 74a and a cutout 76 has been provided therein so that in this position the stop 75 can no longer prevent the bearing member 73 from rotating when the flap 70 is pivoted upward.

The pivoting of the stop 75 when the flap 70 is in the locked position (FIGS. 1 to 5) and when the flap 70 is in the unlocked position (FIGS. 6 and 7), respectively, about the axis 74a takes place automatically when the cutting mechanism 14 is brought into its working position, or into its transport position, respectively, by pivoting about the longitudinal axis 13a. For this, the rigid rod 60 is fitted between the stop 75 and the hitching structure 2, to which items said rod 60 is connected by means of a respective articulation 77, 78. The location of the articulation 78 connecting the rigid rod 60 to the hitching structure 2 is such that:

- when the cutting mechanism 14 is brought into the working position, the stop 75 is pivoted into the position in which the flap 70 is locked,
- when the cutting mechanism 14 is brought into the transport position, the stop 75 is pivoted into the position in which the flap 70 is unlocked.

This cutting machine 1 operates as follows: when the cutting machine 1 is in the working position as depicted in FIGS. 1 to 3, the cutting mechanism 14 extends at least substantially at right angles to the direction of forward travel 16 and rests on the ground S. In this working position, the rigid rod 60 is arranged in such a way that the first tension spring 58 is shortened. As a result of this, the double lever 52 is oriented substantially along the suspension arm 12, and the second tension spring 61 is also shortened, as depicted in FIG. 3. It will be observed that in this position of the double lever 52, the catch 48 extends substantially at right angles to the elongate opening 33 of the limiter 28, thus allowing said limiter 28 to move with respect to the journal 27 between the limits allowed by the stops 31, 32 and thus allowing the cutting mechanism 14 to pivot about the longitudinal axis 15a of the second articulation 15.

As described earlier, the cutting mechanism 14 can, in a first phase, pivot freely about the longitudinal axis 15a between the limits allowed by the stops 31, 32 and, in a second phase, pivot in a direction beyond the limit allowed by the stop 32 against the forces developed by the compression spring 36. An embodiment of this kind makes it possible, when working with the cutting machine 1, for the cutting mechanism 14 easily to adapt to the lie of the land (first phase) while at the same time allowing further pivoting of said cutting mechanism 14 under certain extreme conditions, so that it is possible to cut matter along a mound of earth, for example.

In this working position of the rigid rod 60, the cutout 76 of the stop 75 extends opposite the bearing member 73. This prevents the flap 70 from pivoting upward so that access cannot be had to the cutting members 20.

To bring the cutting machine 1 from the working position into the windrowing position, the operator actuates the hitching device 6 of the motor vehicle 7 so as to raise the cutting machine 1 substantially vertically.

While it is being brought into the windrowing position, the cutting mechanism 14 pivots somewhat about the longitudinal axis 15a until the first stop element 40 bears against the journal 27 (FIGS. 4 and 5). In the windrowing position, the pivoting torque of the cutting mechanism 14 is not enough to compress the compression spring 36, and this advantageously allows the amount of pivoting of said cutting mechanism 14 to be reduced and thus allows the latter to be kept substantially parallel to the ground S. This advantageously makes it possible to have a large ground clearance in the windrowing position, so that maneuvers can be performed at the end of the field without the cutting mechanism 14 interfering with the ground S.

It will be further noted that, when being brought into the windrowing position, the compression spring 36 additionally allows the cutting mechanism 14 to be brought back into a substantially horizontal position when this mechanism has first pivoted about the longitudinal axis 15a, until said compression spring 36 is compressed.

When the operator wishes to bring the cutting machine 1 from the windrowing position into the transport position, he actuates the hydraulic ram 19 using the motor vehicle 7, to make this ram lengthen, thus allowing the suspension arm 12 and the cutting mechanism 14 to pivot about the longitudinal axis 13a of the first articulation 13 until said cutting mechanism 14 is extending in the direction of forward travel 16 substantially behind the hitching structure 2.

As the cutting mechanism 14 and the suspension arm 12 pivot about the longitudinal axis 13a, the pivoting of said cutting mechanism 14 about the longitudinal axis 15a of the second articulation 15 is automatically prevented.

If one were to stand in front of the cutting mechanism 14 and watch it as it pivots from its windrowing position into the transport position, one would see that the rigid rod 60 pulls on the first tension spring 58 which acts on the double lever 52 which pivots clockwise (FIGS. 3 and 7) about the longitudinal axis 27a of the journal 27. While this is happening, the catch 48 pivots also clockwise, until it comes opposite the stop 31 of the limiter device 23, said pivoting being stopped by a nose 80 of the catch 48 which comes to rest laterally against the stop 31.

In this locked position it can be seen that the catch 48 is held firmly in place by the first tension spring 58. The catch 48—journal 27 assembly cannot move with respect to the limiter 28 (or can move very little within the limits of the play allowed for the mechanism to operate correctly), the result of this being that it prevents the pivoting of the cutting mechanism 14 about the longitudinal axis 15a when said cutting mechanism 14 is subjected to a relatively low pivoting torque, as it is the case most of the time, while the cutting machine 1 is being transported. Should the cutting mechanism 14 be subjected to a higher pivoting torque, as may occur when the cutting machine 1 is being transported by the motor vehicle 7 over uneven ground, the stop 32, or more specifically the compression spring 36, dissipates all or some of the force generated by the pivoting of the cutting mechanism 14 about the longitudinal axis 15a in the direction of the arrow 81 depicted in FIG. 7.

When being brought into the transport position, the rigid rod 60 additionally causes the stop 75 to pivot about the axis 74a of the journal 74 so that the cutout 76 allows the flap 70 to pivot upward.

It will also be noted that when the double lever 52 pivots clockwise about the longitudinal axis 27a of the journal 27, said double lever 52 acts on the second tension spring 61.

When the operator again wishes to bring the cutting machine 1 from the transport position into the windrowing position, he actuates the hydraulic ram 19 in the opposite direction so that it shortens, which allows the suspension arm 12 and the cutting mechanism 14 to pivot about the longitudinal axis 13a until said cutting mechanism 14 is extending substantially at right angles to the direction of forward travel 16. For this, the rigid rod 60 at least partially relinquishes its action on the first tension spring 58 and this has the effect of pivoting the double lever 52 counterclockwise about the longitudinal axis 27a under the effect of the action of the second tension spring 61. While this is happening, the catch 48 pivots, also counterclockwise, until it extends substantially at right angles to the elongate opening 33 so as to allow the catch 48—journal 27 assembly to move with respect to the limiter 28, which again allows the cutting mechanism 14 to pivot about the longitudinal axis 15a of the second articulation 15 as described earlier. It will also be noted that during this movement to the windrowing position, the rigid rod 60 causes the stop 75 to pivot about the axis 74a so that this stop prevents the bearing member 73 from pivoting when the flap 70 is pivoted upward.

Next, to bring the cutting machine 1 from the windrowing position into the working position, all the operator needs to do is lower said cutting machine 1 using the hitching device 6 of the motor vehicle 7.

Figure 8:
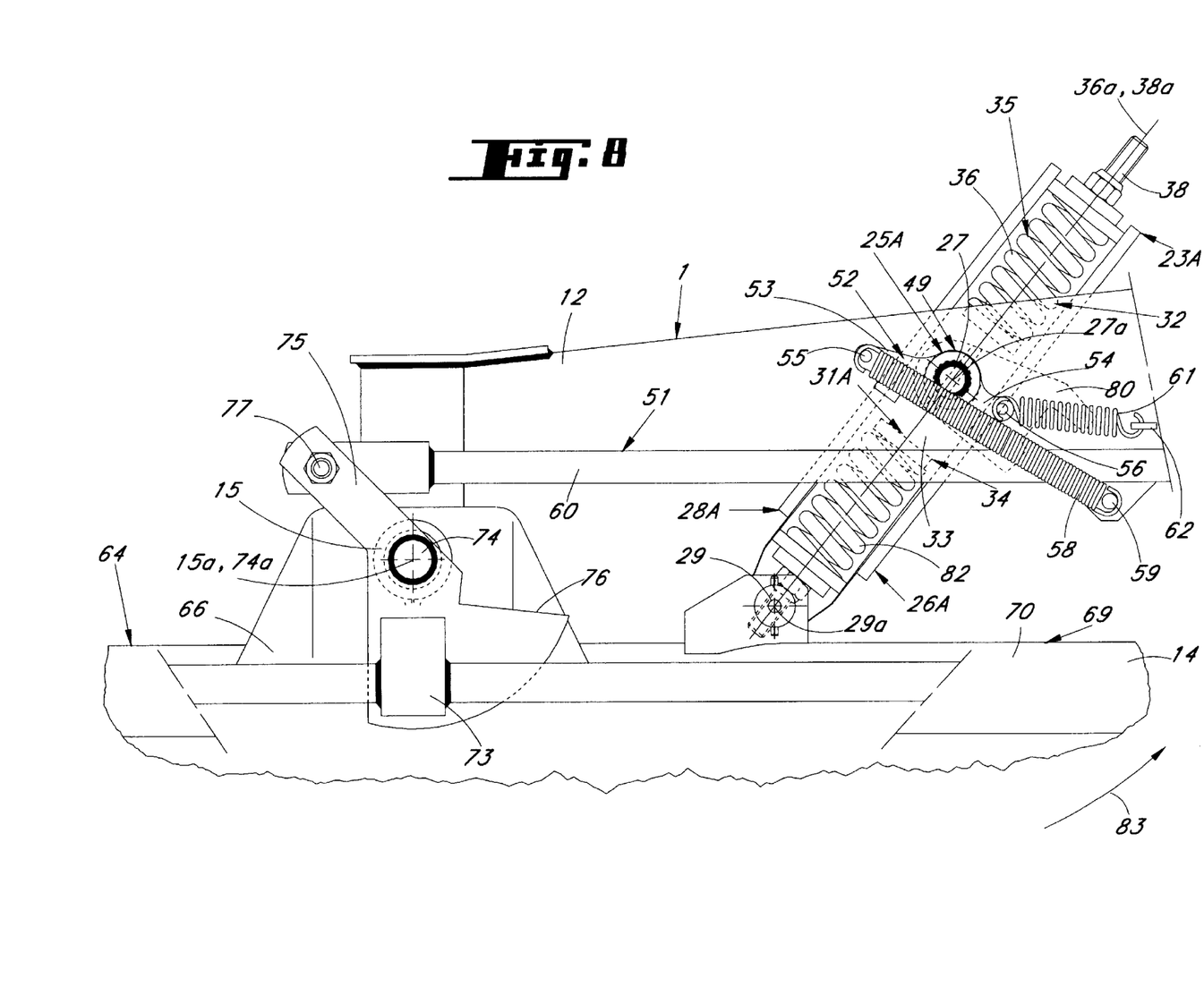
FIG. 8 depicts, on an enlarged scale, a part view of the cutting machine equipped with the limiter device, in a second embodiment.

FIG. 8 depicts a second embodiment of the limiter device according to the present inventive idea.

This limiter device 23A comprises a certain number of elements which have been described earlier. These elements will therefore retain the same reference numerals and will not be described again. It also comprises a certain number of elements which are comparable with elements of the limiter device 23. These elements will be given the same reference numerals as the comparable elements of the limiter device 23, followed by the letter A. They will be described only if this should prove necessary.

The limiter device 23A is, overall, similar to the limiter device 23. The difference lies in the fact that the stop 31A of the limiter device 23A also comprises an elastic element which, in the embodiment depicted, is a second compression spring 82 entirely comparable with the compression spring 36 of the other stop 32. This second compression spring 82 is connected, on the one hand, to the limiter 28A at the end 34 closest to the third articulation 29 of the elongate opening 33 and is intended, on the other hand, to come into contact with the journal 27 when the cutting mechanism 14 pivots about the longitudinal axis 15a by a certain amount in the direction defined by the arrow 83 depicted in FIG. 8. The characteristics of this second compression spring 82 can also be modified by means of a device identical to the one which allows the characteristics of the compression spring 36 to be modified, as described earlier.

Such an embodiment both allows the cutting mechanism 14 to pivot, in a first phase, freely about the longitudinal axis 15a between the limits allowed by the stops 31A, 32 and, in a second phase, beyond the limits allowed by said stops 31A, 32, against the forces developed by the compression springs 36, 82. The cutting mechanism 14 can thus pivot further about the longitudinal axis 15a while at the same time being kept substantially horizontally in the windrowing position. In addition, during transport, the forces generated by the pivoting of the cutting mechanism 14 about the longitudinal axis 15a are dissipated in full or in part by the compression springs 36, 82 irrespective of the direction of pivoting of said cutting mechanism 14.

Finally, various modifications can be made to the embodiments just described, particularly as regards the construction of the various elements, or by substituting technical equivalents, without in any way departing from the field of protection.

It will first of all be understood that the subject of the present invention can be applied to a cutting machine other than the one described in document FR-A2726 152.

It will also be understood that the elastic element(s) of the stop(s) 31, 32; 31A may perfectly well be made up of one (several) elastic element(s) other than the compression spring(s).

It is also perfectly possible to replace the compression springs 36, 82 with a single compression spring combined with a device which makes it possible to act on said single compression spring irrespective of the direction in which the cutting mechanism 14 pivots about the longitudinal axis 15a.

It is furthermore perfectly possible to replace the catch 48 with another catch which has an anchoring nose that allows the catch (other one)—journal 27 assembly to be fixed to the limiter 28, this resulting in the pivoting of the cutting mechanism 14 about the longitudinal axis 15a being prevented irrespective of the intensity of the pivoting torque.

The cutting mechanism may be of any kind intended for harvesting fodder, the upkeep of greenbelt, shredding of plant matter, etc.

It is even possible to attach to it members that are intended to treat the cut product, such as conditioning members for example.

What is claimed as new and desired to be secured by Letters Patent of the United States is:

1. An agricultural machine having a limiter device, said limiter device comprising:

a first assembly connected to a first unit and a second assembly connected to a second unit, said second unit being connected to the first unit by an articulated axis allowing the second unit to pivot about the axis within limits allowed by at least one stop, the articulated axis being oriented substantially parallel to the direction of forward travel;

wherein said at least one stop is elastically deformable so as to limit pivoting of the second unit about the axis when the second unit is subjected to a first pivoting torque, and so as to tolerate a much greater amount of pivoting of the second unit about the axis when the second unit is subjected to a second pivoting torque.

2. Limiter device as claimed in claim 1, wherein the second pivoting torque is greater than the first pivoting torque.

3. Limiter device as claimed in claim 1, wherein the at least one stop includes at least one elastic element being connected to one of the assemblies and contacting with the other assembly when the second unit pivots about the axis by a certain amount.

4. An agricultural machine having a limiter device, said limiter device comprising:

a first assembly connected to a first unit and a second assembly connected to a second unit, said second unit being connected to the first unit by an articulated axis allowing the second unit to pivot about the axis within limits allowed by at least one stop;

wherein said at least one stop is elastically deformable so as to limit pivoting of the second unit about the axis when the second unit is subjected to a first pivoting torque, and so as to tolerate a much greater amount of pivoting of the second unit about the axis when the second unit is subjected to a second pivoting torque;

wherein the at least one stop includes at least one elastic element being connected to one of the assemblies and contacting the other assembly when the second unit pivots about the axis by a certain amount;

wherein the second unit can pivot about the axis in two distinct phases:
 a first phase, to which the limited pivoting of the second unit corresponds and in which the second unit pivots freely about the axis between the limits allowed by the at least one stop; and
 a second phase to which the much greater pivoting of the second unit corresponds and in which the second unit pivots about the axis between the limits allowed by the at least one stop against forces developed by the at least one elastic element.

5. Limiter device as claimed in claim 4, wherein the at least one elastic element returns the second unit from the second phase to the first phase.

6. Limiter device as claimed in claim 4, wherein a position and stiffness of the at least one stop are adjustable.

7. Limiter device as claimed in claim 4, wherein a position or stiffness of the at least one stop is adjustable.

8. Limiter device as claimed in claim 4, wherein the at least one stop dissipates at least some forces generated by pivoting of the second unit about the articulated axis.

9. Limiter device as claimed in claim 4, further comprising a locking device preventing pivoting of the second unit about the articulated axis.

10. Limiter device as claimed in claim 9, wherein the locking device comprises a catch being connected to one of the assemblies and acting on the other assembly in order to prevent the second unit from pivoting about the articulated axis.

11. Limiter device as claimed in claim 10, further comprising an operating device for operating the locking device.

12. Machine for cutting plant matter, comprising:

a hitching structure connected to a motor vehicle;

a cutting mechanism extending:
 in a working position, transversely to a direction of forward travel and resting on ground;
 in a windrowing position, transversely to the direction of forward travel and above the ground;

a suspension arm connected to the hitching structure and to the cutting mechanism by an articulated axis oriented substantially parallel to the direction of forward travel when the cutting mechanism is in the working position, so as to allow the cutting mechanism to pivot about the axis;

a limiter device including at least one stop allowing the cutting mechanism to pivot about the axis within limits allowed by the at least one stop;

wherein the at least one stop is elastically deformable so as to limit pivoting of the cutting mechanism about the axis when the cutting mechanism is subjected to a first pivoting torque, and so as to tolerate a much greater amount of pivoting of the cutting mechanism about the axis when the cutting mechanism is subjected to a second pivoting torque.

13. Machine for cutting plant matter as claimed in claim 12, wherein the second pivoting torque is greater than the first pivoting torque.

14. Machine for cutting plant matter as claimed in claim 12, wherein the at least one stop includes at least one elastic element being connected to the suspension arm and contacting the cutting mechanism when the cutting mechanism pivots about the axis by a certain amount.

15. Machine for cutting plant matter, comprising:

a hitching structure connected to a motor vehicle;

a cutting mechanism extending:
 in a working position, transversely to a direction of forward travel and resting on ground;
 in a windrowing position, transversely to the direction of forward travel and above the ground;

a suspension arm connected to the hitching structure and to the cutting mechanism by an articulated axis oriented substantially parallel to the direction of forward travel when the cutting mechanism is in the working position, so as to allow the cutting mechanism to pivot about the axis;

a limiter device including at least one stop allowing the cutting mechanism to pivot about the axis within limits allowed by the at least one stop, wherein the at least one stop includes at least one elastic element being connected to the suspension arm and contacting the cutting mechanism when the cutting mechanism pivots about the axis by a certain amount;

wherein the cutting mechanism can pivot about the axis in two distinct phases:
 a first phase, to which limited pivoting of the cutting mechanism corresponds and in which the cutting mechanism pivots freely about the axis between the limits allowed by the at least one stop; and a second phase to which the much greater pivoting of the cutting mechanism corresponds and in which the cutting mechanism pivots about the axis between the limits allowed by the at least one stop against forces developed by the at least one elastic element.

16. Machine for cutting plant matter as claimed in claim 15, wherein the at least one elastic element returns the cutting mechanism from the second phase to the first phase.

17. Machine for cutting plant matter as claimed in claim 15 wherein a position and stiffness of the at least one stop are adjustable.

18. Machine for cutting plant matter as claimed in claim 15, wherein a position or stiffness of the at least one stop is adjustable.

19. Machine for cutting plant matter as claimed in claim 15, wherein the at least one stop dissipates at least some forces generated by pivoting of the cutting mechanism about the articulated axis.

20. Machine for cutting plant matter as claimed in claim 15, further comprising a locking device preventing pivoting of the cutting mechanism about the articulated axis.

21. Machine for cutting plant matter as claimed in claim 20, wherein the locking device comprises a catch being connected to the suspension arm and acting on the cutting mechanism in order to prevent the cutting mechanism from pivoting about the articulating axis.

22. Machine for cutting plant matter as claimed in claim 21, further comprising an operating device for operating the locking device.

23. Machine for cutting plant matter as claimed in claim 22, wherein the cutting mechanism mat be pivoted into a transport position and, when brought into the transport position, the operating device automatically operates the locking device.

* * * * *

UNITED STATES PATENT AND TRADEMARK OFFICE
CERTIFICATE OF CORRECTION

PATENT NO. : 6,128,892

DATED : October 10, 2000

INVENTOR(S): Horst Neuerburg, et al.

It is certified that an error appears in the above-identified patent and that said Letters Patent is hereby corrected as shown below:

On the title page, the Assignee information has been omitted and the Inventors' information is incorrect. This information should be listed as follows:

[75] Inventors: Horst Neuerburg; Fernand Kieffer, both
of Saverne, France

[73] Assignee: Kuhn, S.A.
Saverne, France

Signed and Sealed this

Fifteenth Day of May, 2001

*Attest:*

NICHOLAS P. GODICI

*Attesting Officer*    *Acting Director of the United States Patent and Trademark Office*